Nov. 3, 1931.  D. G. SHEARER  1,829,912

COMBINED SOUND AND VIEW FILM AND METHOD OF MAKING THE SAME

Filed June 12, 1929

Inventor
Douglas G. Shearer
By Lyon & Lyon
Attorneys

Patented Nov. 3, 1931

1,829,912

UNITED STATES PATENT OFFICE

DOUGLAS G. SHEARER, OF SANTA MONICA, CALIFORNIA, ASSIGNOR TO METRO-GOLDWYN-MAYER CORPORATION, OF CULVER CITY, CALIFORNIA, A CORPORATION OF NEW YORK

COMBINED SOUND AND VIEW FILM AND METHOD OF MAKING THE SAME

Application filed June 12, 1929. Serial No. 370,412.

This invention relates to a method of making a film embracing scenes, together with sound recordings in proper timed relation. The invention also relates to a new and novel film which consists of scene and sounds, the two recordings or impressions being combined in one unitary piece for reproductive purposes.

At the present time there are two principal ways of recording sound on a strip of material such as a strip of film and running it in synchronism with the film on which the views or action is recorded. In one method the sound is recorded on one piece of material and the action or views are recorded on another piece of material or film. These two separate pieces are then run separately through two separate machines, one an ordinary motion picture projector and the other a sound-reproducing mechanism, the two pieces of equipment being run in synchronism.

The disadvantages of this two-film method are the added cost, the possibilities of error in projection and the added shipping weight and handling. The possibility of error in projection is the greatest disadvantage. It is difficult to insure starting both strips of material at the same time and at the same speed. Furthermore, if one of the films is broken and a section thereof is taken out for splicing purposes, such film will, of course, be of a different length than the accompanying recording and in this manner they will not harmonize. It is difficult to locate the corresponding breakage point in the sound record so as to delete the corresponding portion thereof.

The "two-film" method has the advantage of not reducing the area of the sound or action field. The entire effective width of the action or view film is devoted to the views and in this way a greater range of camera is permitted. Furthermore, the action record and the sound record may be developed and printed separately, thereby permitting a development of the highest degree of perfection in each record. The action or view film may be dye-toned or colored or otherwise treated without impairing or affecting or complicating the accompanying sound record.

The second method of recording and producing action or views on continuous films, together with a sound recording, comprises printing the sound record on the same strip of positive film as the picture record. This method has the advantage that, in case of a break in the film during projecting or running, both records (picture and sound) will stay in synchronism, as a single splice affects both records. Furthermore, the projection operator cannot make a mistake or error in threading the machines used for projection of the picture and reproduction of the sound, as the sound record is a part of the same film. Furthermore, the possibility of misplacing the sound record which accompanies a particular picture film does not exist, as in the previously described method.

The disadvantages of the method in which both the sound and the picture are recorded upon the same strip are numerous. Both the sound record and the picture record have to be developed simultaneously and either one or the other must be sacrificed to some extent. It is impossible to choose and to discriminate between the two records as to strength and kind of developer, time of developing, et cetera. Colored film stock cannot be conveniently employed and no color cuts conveniently made, as the color affects the sound record. Part of the picture space has to be sacrificed to allow room for the sound record. This means that all scenes, when photographed, must be properly masked off in the camera or in the printer which makes a change in the screen proportions. Scenes taken in an ordinary manner with an ordinary camera have to be cut down and laboriously and unsuitably reprinted into the positive constituting the combined picture and sound recording.

One of the objects of this invention is to disclose and provide a method of combining a picture film with a sound record in such manner that a unitary article is produced without affecting the normal picture space.

Another object is to disclose and provide a method of producing a combined picture and sound record in which the picture record may be colored.

Another object is to disclose and provide a unitary sound and picture record of which the units can be developed and treated separately before being combined.

Another object is to disclose and provide a method of producing a combined sound and picture record which permits separate development control of each record.

Another object is to disclose and provide a method of producing a combined sound and picture record in which materials most suitable to the requirements of a picture record, and to a sound record are mechanically combined to produce a single strip, each of said materials being used for their respective purposes.

Further objects, uses and advantages of the method described herein and embraced by this invention, and of the article produced thereby, will be apparent to those skilled in the art, from the following detailed description.

In describing the invention reference will be had to the appended drawings, in which Figure 1 is a representation of a portion of the combined sound and picture record.

Figure 1:
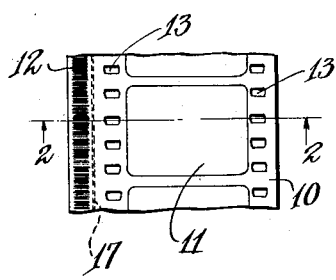

In carrying out the invention, any ordinary continuous film such as, for example, the standard 35 millimeter film 10 is employed, and the picture, view or action printed thereon from a suitable negative, said negative being obtained in the customary manner and by the use of ordinary motion picture cameras. The normal space is, or may be, occupied by the picture or view, said space being represented at 11. In this manner any desired emulsion, stock, time and control of developing may be used so as to produce a picture, action or view film of the highest quality. Colored stocks may be employed, or the film dye-toned or otherwise treated. The continuous film 10, after having been developed, fixed and dried, is then ready to be combined with a suitable sound recording.

The sound recording (consisting of conversation, vocal or instrumental music, or any noises correlated with the pictures recorded upon the film 10) is then preferably attached to the picture film 10. The sound recording may be made on any suitable photographic film, or such sounds may be recorded in any suitable manner on paper stock or even on metallic tape. When photographic film is used for the sound record, the emulsion particularly adapted for the recordation of sound thereon may be chosen and such sound record may be developed and treated in any desired manner so as to produce the most desired type of sound record. As shown in the drawings, the sound record comprises a relatively narrow strip of film 12 preferably bearing thereon a suitable sound record. The sound record shown in the drawings is that obtained by the use of a single light valve and is of the variable density type. The sound record 12 may be of any desired width and may be originally recorded either upon a strip of the finished size or it may be recorded upon a wider strip which is then cut longitudinally so as to trim the record down to the proper width.

At the present time, when the sound record is made a part of the finished film and is printed within the sprocket holes 13, the sound track is limited in width and rarely, if ever, exceeds an eighth of an inch. A product made in accordance with this invention is not thus limited, and any desired width of sound record may be employed, thereby permitting greater fidelity in reproduction. If desired, the sound record 12 can be made wide enough to accommodate more than one track, side by side. When the latter modification is employed, vocal sounds may be recorded on one track and instrumental sounds recorded on the other, thereby permitting the use of separate electrical recording equipment more suited to each type of sound. Such a double track also allows separate reproducing units or loud speakers to be employed. For example, the orchestration of a motion picture film may be reproduced from loud speakers and reproducing units placed in the orchestra pit, whereas the vocal and other sounds actually originating in the view or picture may be reproduced from units or loud speakers placed back of the screen.

Figure 3:
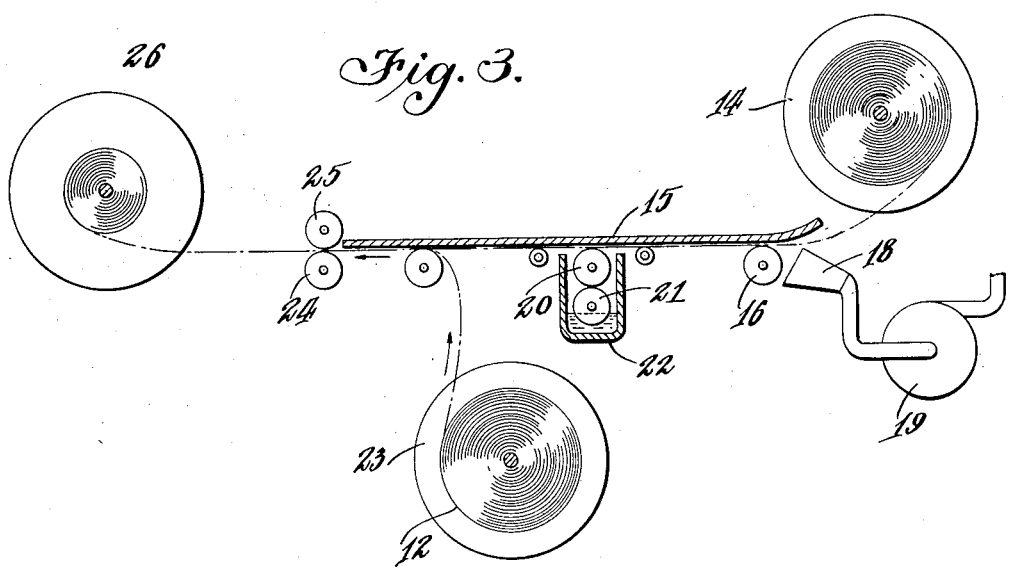
Figure 3 is a diagrammatic representation of an apparatus which may be employed in carrying out the method of this invention.

The sound record, such as the strip 12, is preferably attached to the picture film 10 exteriorly of the sprockets 13 and such sound record may be attached to the picture film in any suitable manner. In Figure 3 a diagrammatic representation is given of apparatus which may be employed in combining the sound and picture records by one preferred method.

Figure 2:
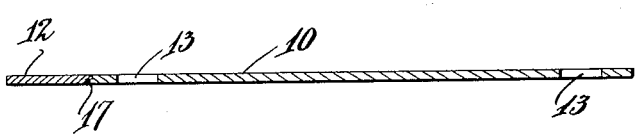
Figure 2 is a section taken through the combined record shown in Figure 1.

The picture film 10 is fed by suitable means from a reel 14 under a suitable guide 15 so as to permit a milling cutter 16 to cut a step or shoulder in the edge of the film, said step or shoulder being shown at 17, Figure 2. The cuttings from the film 10 produced by the milling cutter 16 (which is driven in any suitable manner) may be removed by means of suction applied by a nozzle 18, said nozzle 18 being connected with a suction fan 19. The cut film 10 then preferably passes over a rotating disc 20, said disc applying a thin film of suitable cementing material such as, for example, amyl acetate. The disc 20 may rotate in contact with a lower disc or roller 21 which, in turn, dips bodily into the cementing solution retained within the tank 22. The disc 20 preferably applies a thin film of the cementing material to the film 10 upon the step or shoulder 17 cut therein.

The sound record 12 is preferably fed from a suitable reel 23 and contacted with the prepared film 10. The sound record 12 on the reel 23 has preferably been treated so as to bear thereon a complementary shoulder or step adapted to co-operate with the shoulder or step 17 cut in the film 10. By means of suitable guides the sound record 12 and the film 10 are brought into proper position relative to each other and then pressed together by means of heated rollers 24 and 25.

Several series of rollers 24 and 25 may be employed, certain of the rollers preferably rotating in a direction opposed to the travel of the combined film so as to produce a burnishing action and thus weld the sound record to the picture record. The combined sound and picture record may then be wound up upon a reel 26.

By cutting the shoulders or steps 17 in the sound record and in the picture record to approximately one-half the thickness of the finished film, the longitudinal splice or joint made during the hereinabove described operation, does not increase the total thickness of the film. If the sound record 12 is made on a photographic film and amyl acetate is used as the cementing material, an almost imperceptible line is the only indication of the fact that two separate pieces of film constitute the finished product.

Necessarily care is taken during the hereinabove described combining operation that the sound record 12 and the picture film 10 are in synchronism. Furthermore, the use of a film made as hereinabove described necessitates slight changes in the ordinary projection machines, such changes including the provision of clearance on the gates and sprockets.

It will be seen, therefore, that a film made in the hereinabove described manner permits the use of the entire workable area of the picture film for views and also permits the use of a sound record of any desired width in conjunction therewith. The disadvantages of employing separate sound and film records are obviated without the disadvantages incidental to the use of a sound record made within the sprocket holes on a normal picture film. Furthermore, each of the records may be developed in its own particular way without affecting the quality or character of the accompanying record.

It is to be understood that the invention is not to be limited to the precise steps or materials described herein, as numerous changes and modifications may be made in the method, in the apparatus employed in carrying out the method, and in the materials entering into the final product or final combined sound and view film or record without departing from this invention. All such changes and modifications as come within the scope of the appended claim are therefore embraced thereby.

I claim:

A combined continuous picture film and sound record comprising a strip of film bearing pictures between rows of sprocket holes made therein, and a continuous photographic sound record on film stock attached to one longitudinal edge of said picture film, one edge of said sound record and one longitudinal edge of said picture film being stepped and said stepped edges cemented together whereby said combined picture film and sound record are of substantially equal thickness transversely thereof.

Signed at Culver City, Calif., this 3rd day of June, 1929.

DOUGLAS G. SHEARER.